United States Patent
Ewen et al.

(10) Patent No.: US 6,262,199 B1
(45) Date of Patent: Jul. 17, 2001

(54) PROCESS AND CATALYST FOR PRODUCING ISOTACTIC POLYOLEFINS

(75) Inventors: John A. Ewen, Houston, TX (US); Michael J. Elder, Raleigh, NC (US); B. Raghava Reddy, Baytown, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/087,547

(22) Filed: May 29, 1998

(Under 37 CFR 1.47)

Related U.S. Application Data

(62) Division of application No. 07/911,634, filed on Jul. 10, 1992, now abandoned.

(51) Int. Cl.$^7$ .................. C08F 4/60; C08F 4/64
(52) U.S. Cl. .................. 526/127; 526/160; 526/943; 502/117
(58) Field of Search .................. 526/127, 160, 526/943; 556/53; 502/103, 117, 152

(56) References Cited

U.S. PATENT DOCUMENTS

| | | | |
|---|---|---|---|
| 5,145,819 | * 9/1992 | Winter et al. | 502/117 |
| 5,243,001 | * 9/1993 | Winter et al. | 526/127 |
| 5,276,208 | * 1/1994 | Winter et al. | 556/53 |
| 5,278,264 | * 1/1994 | Spaleck et al. | 526/127 |
| 5,328,969 | * 7/1994 | Winter et al. | 526/127 |
| 5,350,817 | * 9/1994 | Winter et al. | 526/119 |
| 5,514,760 | * 5/1996 | Karl et al. | 526/127 |

OTHER PUBLICATIONS

Odian, Principles of Polymerization, Third Edition, John Wiley & Sons, pp. 606–619, 1991.*

* cited by examiner

*Primary Examiner*—David W. Wu
*Assistant Examiner*—R. Rabago
(74) *Attorney, Agent, or Firm*—William D. Jackson; Jim D. Wheelington

(57) ABSTRACT

This invention is for a metallocene catalyst component comprising a bridged metallocene in which the two substituted indenyl rings are complexed to a metal hydrocarbyl or metal halide. This metallocene catalyst component is useful for polymerizing olefins having three or more carbon atoms to produce a polymer with a isotactic stereochemical configuration. The catalyst component is a stereorigid metallocene described by the formula:

$$R''(CpR_2C_4R_4)(CpR'_2C_4R'_4)MeQ_k$$

wherein $(CpR_2C_4R_4)$ and $(CpR_2C_4R_4)$ are substituted indenyl rings; each R and R' is a hydrogen or a hydrocarbyl radical having 1–20 carbon atoms; R" is a structural bridge between the two indenyl rings imparting stereorigidity to the indenyl rings; Me is a transition metal; and each is a hydrocarbyl radical or is a halogen. Further, one R and R' is a hydrocarbyl radical having 1–20 carbon atoms in a proximal position adjacent to the bridgehead carbon of the indenyl rings. The invention also includes a process of preparing isotactic polyolefins that comprises the use of one or more of the disclosed catalyst components and also a process for preparing the catalyst components.

21 Claims, 3 Drawing Sheets rac-Me$_2$Si[2-MeInd]$_2$ZrCl$_2$

FIG. 3
C-13-NMR spectrum of iPP obtained with I rac-Et[H$_4$Ind]$_2$ZrCl$_2$ / MAO (low molecular weight sample, Mv=6000).
The I-3 regioirregularities are labeled $\underline{G}_a$.
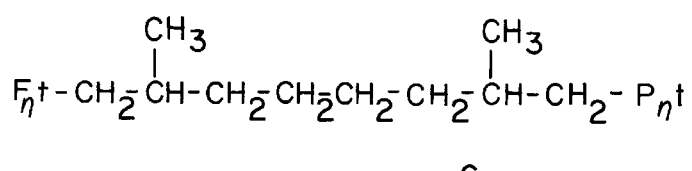
$G_a$
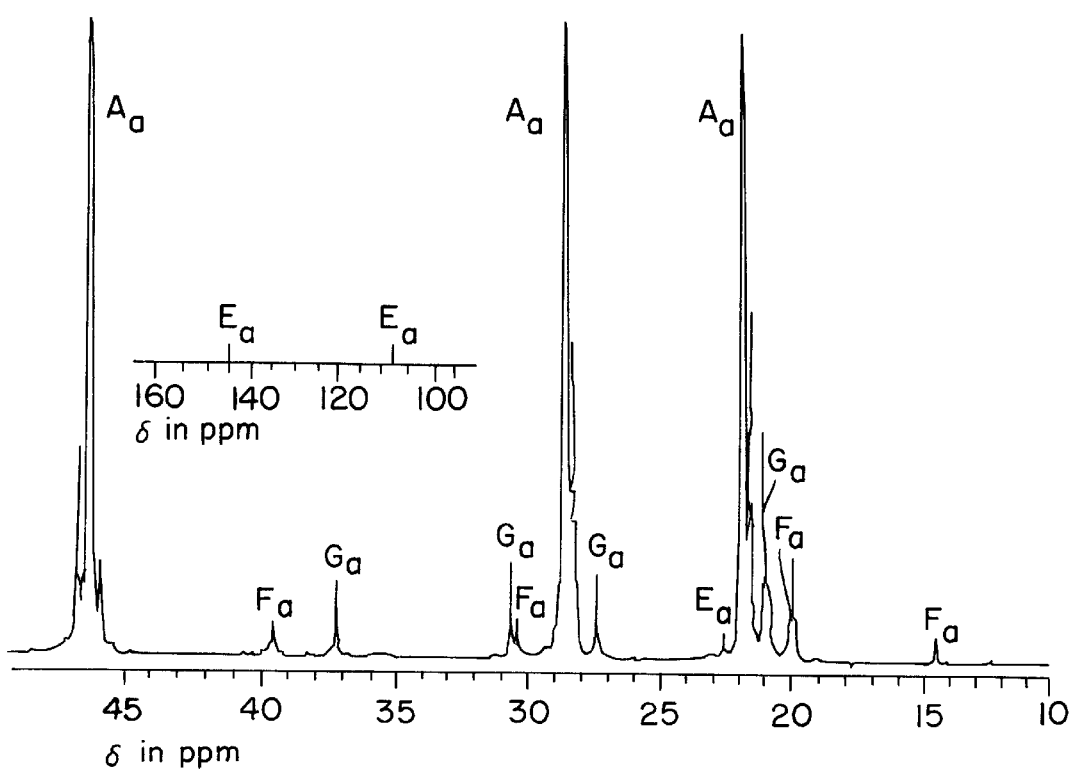

PROCESS AND CATALYST FOR PRODUCING ISOTACTIC POLYOLEFINS

This application is a division of application Ser. No. 07/911,634, filed Jul. 10, 1992. now abandoned.

BACKGROUND OF THE INVENTION

1. Field of the Invention

This invention relates to a metallocene catalyst component useful in preparing isotactic polyolefins. The catalyst component comprises a bridged metallocene in which the two substituted indenyl rings are complexed to a metal hydrocarbyl or metal halide. The invention further includes a process of preparing isotactic polyolefins that comprises the use of one or more of the disclosed catalyst components and also a process for preparing the catalyst components.

2. DESCRIPTION OF THE PRIOR ART

The present invention provides a catalyst and process for polymerizing olefins having three or more carbon atoms to produce a polymer with an isotactic stereochemical configuration. The catalyst and process are particularly useful in polymerizing propylene to form isotactic polypropylene. The isotactic structure is typically described as having the methyl groups attached to the tertiary carbon atoms of successive monomeric units on the same side of a hypothetical plane through the main chain of the polymer, e.g., the methyl groups are all above or all below the plane. Using the Fischer projection formula, the stereochemical sequence of isotactic polypropylene is described as follows:

Another way of describing the structure is through the use of NMR spectroscopy. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is designated as:

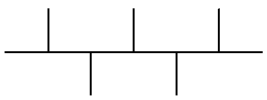

In NMR nomenclature, this pentad is described as . . . rrrr . . . in which each "r" represents a "racemic" dyad, i.e., successive methyl group on alternate sides of the plane. The percentage of r dyads in the chain determines the degree of syndiotacticity of the polymer. Syndiotactic polymers are crystalline and, like the isotactic polymers, are insoluble in xylene. This crystallinity distinguishes both syndiotactic and isotactic polymers from an atactic polymer which is soluble in xylene. Atactic polymer exhibits no regular order of repeating unit configurations in the polymer chain and forms essentially a waxy product.

While it is possible for a catalyst to produce all three types of polymer, it is desirable for a catalyst to produce predominantly isotactic or syndiotactic polymer with very little atactic polymer. Catalysts that produce isotactic polyolefins are disclosed in European Patent Application No. 87870132.5 (Publication No. 0 284 708 published Oct. 5, 1988), and U.S. Pat. Nos. 4,794,096 and 4,975,403. This application and these patents disclosed chiral, stereorigid metallocene catalyst components that are used in the polymerization of olefins to form isotactic polymers and are especially useful in the preparation of a highly isotactic polypropylene.

SUMMARY OF THE INVENTION

The present invention provides an isospecific catalyst, a process for preparing the catalyst and a polymerization process for preparing isotactic polyolefins, more particularly, isotactic polypropylene, using the catalyst. The novel catalyst component provided by the present invention is a stereorigid metallocene described by the formula:

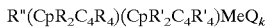

$R''(CpR_2C_4R_4)(CpR'_2C_4R'_4)MeQ_k$ wherein $(CpR_2C_4R_4)$ and $(CpR_2C_4R_4)$ are substituted indenyl rings; each R and R' is a hydrogen or a hydrocarbyl radical having 1–20 carbon atoms; R" is a structural bridge between the two indenyl rings imparting stereorigidity to the indenyl rings; Me is a transition metal; and each Q is a hydrocarbyl radical or is a halogen. Further, one R and R' is a hydrocarbyl radical having 1–20 carbon atoms in a proximal position adjacent to the bridgehead carbon of the indenyl rings.

The present invention provides a process for producing isotactic polyolefins and, particularly, isotactic polypropylene, that comprises utilizing at least one of the catalyst components described by the above formula and introducing the catalyst into a polymerization reaction zone containing an olefin monomer. In addition, a cocatalyst such as alumoxane and/or an ionic compound capable of reacting with the metallocene to form a cationic metallocene may be introduced into the reaction zone. Further, the catalyst component may also be pre-polymerized prior to introducing it into the reaction zone and/or prior to the stabilization of reaction conditions in the reactor.

The present invention also includes a process for preparing a bridged metallocene component comprising contacting a substituted indenyl with an dialkylsilyldichloride followed by a second equivalent of a different substituted indenyl to produce a silicon bridged disubstituted indenyl.

The present invention further includes a process for preparing a bridged metallocene catalyst component comprising contacting a substituted indene anion having proximal substituent(s) on the indenyl ring with a substituted indene anion having proximal substituent(s) under reaction conditions sufficient to produce a bridged substituted diindene. The process further comprises contacting the bridged diindene with a metal compound of the formula $MeQ_k$ as defined above under reaction conditions sufficient to complex the bridged diindene to produce a bridged metallocene wherein Me is a Group IIIB, IVB, VB or VIB metal from the Periodic Table of Elements, each Q is a hydrocarbyl radical having 1–20 carbon atoms or is a halogen and k is the valence of Me minus 2.

BRIEF DESCRIPTION OF THE DRAWINGS

A more complete appreciation of the invention and many of the attendant advantages thereof will be readily understood by reference to the following detailed description when considered in connection with the accompanying drawings wherein:

FIG. 3 is an NMR spectra for the polymer obtained with rac-ethylenebis(tetrahydroindenyl)zirconium dichloride.

DETAILED DESCRIPTION OF THE INVENTION

Figure 1:
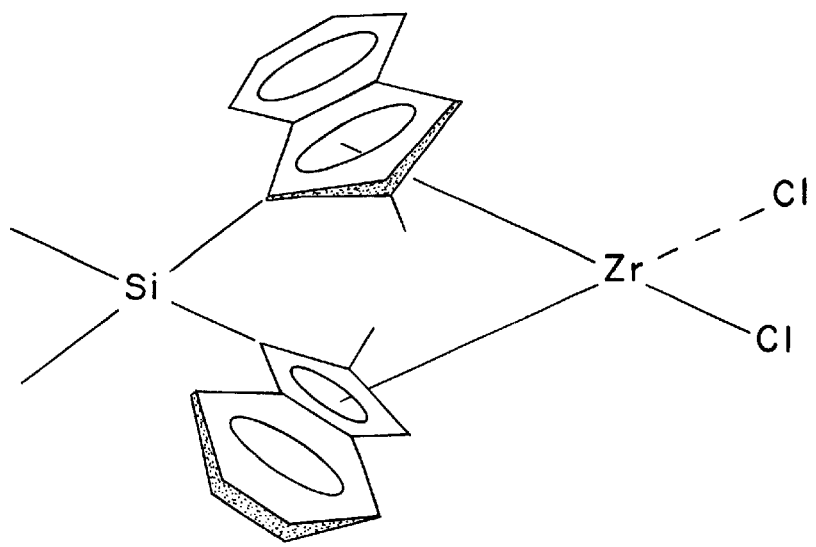
FIG. 1 is an illustration of the structure of a preferred catalyst component of the present invention and specifically shows rac-dimethylsilylbis[2-methylindenyl]zirconium dichloride.

The present invention provides a metallocene catalyst component and processes for making and using the catalyst component, particularly in the production of isotactic polyolefins, especially isotactic polypropylene.

When propylene or other alpha-olefins are polymerized using a catalyst component consisting of a transition metal compound, the polymer product typically comprises a mixture of amorphous atactic and crystalline xylene insoluble fractions. The crystalline fraction may contain either isotactic or syndiotactic polymer, or a mixture of both. Highly iso-specific metallocene catalyst components are disclosed in copending U.S. application Ser. No. 317,089 now abandoned and U.S. Pat. Nos. 4,794,096 and 4,975,403.

The metallocene catalyst components of the present invention may be described by the formula

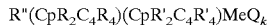
R"(CpR$_2$C$_4$R$_4$)(CpR'$_2$C$_4$R'$_4$)MeQ$_k$ wherein each (CpR$_2$C$_4$R$_4$) and (CpR'$_2$C$_4$R'$_4$) are substituted indenyl rings; R and R' are hydrogen or a hydrocarbyl radical having 1–20 carbon atoms, each R may be the same or different, each R' also may be the same or different, one R and R' is a proximal substituent which is a hydrocarbyl radical from 1–20 carbon atoms, preferably is an alkyl radical of 1–4 carbon atoms and, most preferably, is a methyl radical, where proximal refers to position 2 of the indenyl ring relative to the carbon attached to R" (position 1), i.e., adjacent to the bridgehead carbon, the R and R' proximal substitutents being the same or different, but preferably are the same, and the remaining R and R' substituents are preferably hydrogen; R" is a structural bridge between the two indenyl rings imparting stereorigidity to the indenyl rings within the catalyst component, preferably is a hydrocarbyl radical containing silicon as the bridging component, more preferably, is an alkyl radical of one to eight carbon atoms containing silicon as the bridging component and, most preferably is dimethylsilyl; Me is a transition metal, preferably, is a Group IVB, VB or VIB metal from the Periodic Table of Elements, more preferably, is a Group IVB metal and, most preferably, is zirconium; each Q is a hydrocarbyl radical having 1–20 carbon atoms or is a halogen, preferably, is halogen and, most preferably, is chlorine; k is the valence of Me minus 2. Preferably, all R and R' other than the proximal substituents are hydrogen and, most preferably, (CpR$_2$C$_4$R$_4$) and (CpR'$_2$C$_4$R'$_4$) are both 2-methyl indenyl.

An additional representation of the metallocene catalyst components of the present invention is:

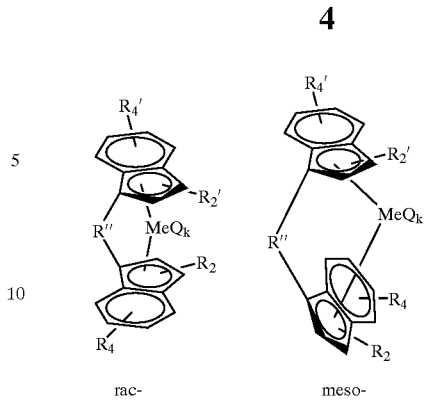

where R, R', R", Me and Q are as defined above.

The metallocene catalyst component may be supported or unsupported. The support can be any solid which is chemically inert and unreactive with the metallocene and the other catalyst components. Examples of support material are porous materials such as talc; inorganic oxides, such as Group IIA, IIIA, IVA or IVB metal oxides, specifically, silica, alumina, magnesia, titania, zirconia, and mixtures thereof; and resinous materials, such as polyolefins, specifically, finely divided polyethylene, as disclosed in U.S. Pat. No. 4,701,432, hereby incorporated by reference.

The catalyst component may be prepared by any method known in the art. Two methods of preparing the catalyst component are disclosed below. It is important that the catalyst complex be "clean" as usually low molecular weight, amorphous polymer is produced by impure catalysts. Generally, the preparation of the catalyst complex consists of forming and isolating the substituted indenyl ligands, the anions of which are then reacted with a halogenated metal to form the complex.

A process for preparing a bridged metallocene catalyst component comprises contacting a substituted indene having a proximal substituent on the indenyl ring with the same or another substituted indene having a proximal substituent under reaction conditions sufficient to produce a bridged substituted diindene. The process further comprises contacting the anionic form of the bridged substituted diindene with a metal compound of the formula MeQ$_v$ wherein Me is a Group IIIB, IVB, VB or VIB metal from the Periodic Table of Elements, each Q is a hydrocarbyl radical having 1–20 carbon atoms or is a halogen and v is the valence of Me, under reaction conditions sufficient to complex the bridged diindene to produce a bridged metallocene. The process step of contacting the bridged substituted diindene with a metal compound can be performed in a chlorinated solvent.

Another process for preparing a bridged metallocene catalyst component comprises contacting a substituted indene having proximal substituents on the indenyl ring with an alkylsilylchloride of the formula R^$_2$SiX$_2$ where R^ is a hydrocarbyl radical having 1–20 carbon atoms and X is an halogen. A second equivalent of the same or another substituted indene having proximal substituents on the indenyl ring is added to produce a silicon bridged disubstituted indene. The subsequent steps are similar to those above for producing a bridged disubstituted indene coordinated to a metal.

The metallocene catalyst components of the present invention are useful in many of the polymerization processes known in the art including many of those disclosed for the preparation of isotactic polypropylene. When the catalyst components of the present invention are used in these types of processes, the processes produce isotactic polymers rather than atactic or syndiotactic polymers. Further examples of polymerization processes useful in the practice of the present invention include those disclosed in U.S. Pat. No. 4,767,735, and U.S. Pat. No. 4,975,403, the disclosures of which are hereby incorporated herein by reference. These preferred polymerization procedures include the step of prepolymerizing the catalyst component by contacting the catalyst component with a cocatalyst and an olefin monomer prior to introduction into a reaction zone at a temperature below that of polymerization.

Consistent with the prior disclosures of metallocene catalyst components for the production of isotactic polymers, the catalyst components of the present invention are particularly useful in combination with a cocatalyst, preferably an alumoxane, an alkyl aluminum, or other Lewis acids or a mixture thereof to form an active catalyst. In addition, a complex may be isolated between a metallocene catalyst component as described herein and an aluminum cocatalyst in accordance with the disclosure of U.S. Pat. Nos. 4,752,597 and 4,791,180. As disclosed therein, a metallocene is reacted with an excess of alumoxane in the presence of a suitable solvent. A complex of the metallocene and alumoxane may be isolated and used as a catalyst in the present invention.

The alumoxanes useful in combination with the catalyst component of the present invention, either in the polymerization reaction or in forming the complex disclosed in U.S. Pat. Nos. 4,752,597 and 4,791,180, may be represented by the general formula $(R-Al-O-)_n$ in the cyclic form and $R(R-Al-O)-_n-AlR_2$ in the linear form wherein R is an alkyl group with one to five carbon atoms and n is an integer from 1 to about 20. Most preferably, R is a methyl group. The alumoxanes can be prepared by various methods known in the art. Preferably, the are prepared by contacting water with a solution of trialkyl aluminum, such as, trimethyl aluminum, in a suitable solvent such as benzene. Another preferred method includes the preparation of alumoxane in the presence of a hydrated copper sulfate as described in U.S. Pat. No. 4,404,344, the disclosure of which is hereby incorporated by reference. This method comprises treating a dilute solution of trimethyl aluminum in toluene with copper sulfate. The preparation of other aluminum cocatalysts useful in the present invention may be prepared by methods known to those skilled in the art.

An alternative to the use of MAO co-catalyst is a catalyst system of a metallocene, a Lewis acid ionic ionizing agent and, optionally, an aluminum alkyl. Methods for preparing a cationic metallocene catalyst system are disclosed in European Patent Application Nos. 90870174.1, 90870175.8 and 90870176.6 (Publication Nos. 0 426 637 A2, 0 426 638 A2 and 0 427 697 A2, published on May 8, 1991; May 8, 1991 and May 15, 1991, respectively), which are hereby incorporated by reference. The ionizing agent which is an ion pair ionizes the metallocene to a cation. The metallocene cation forms an ion pair with the anion component of the ionizing agent. The segment of the metallocene compound removed by ionization forms an anion which associates with the cation component of the ionizing agent. The ion pair formed from the anion of the segment of metallocene and the cation of ionizing agent is chemically inert and non-reactive with regard to the metallocene cation and the metallocene cation-ionizing agent anion ion pair which is an active catalyst for polymerization of olefins.

An aluminum alkyl, such as triethyl aluminum, is useful in such an ionic catalyst system to improve yields. It is believed that aluminum alkyl acts to enhance the ionizing process and to scavenge catalyst poisons.

The polymerization procedures useful with the isospecific metallocene catalyst are known in the art. In general, the polymerization process comprises:
a) selecting a stereorigid metallocene described by the formula:

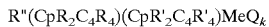

wherein $(CpR_2C_4R_4)$ and $(CpR'_2C_4R'_4)$ are substituted indenyl rings; each R and R' is a hydrogen or a hydrocarbyl radical having 1–20 carbon atoms, each R being the same or different, each R' also being the same or different, one R and R' being a hydrocarbyl radical having 1–20 carbon atoms in a proximal position adjacent to the bridgehead carbon of the indenyl rings; R" is a structural bridge between the two indenyl rings imparting stereorigidity to the indenyl rings; Me is a transition metal; and each Q is a hydrocarbyl radical or is a halogen; and
b) forming a catalyst by contacting the metallocene with a cocatalyst or a Lewis acid ionic ionizing agent;
c) bringing the catalyst in contact with an olefin of at least three carbon atoms under polymerization conditions.
d) extracting isotactic polyolefin of high molecular weight and crystallinity.

The Examples given below illustrate the present invention and its various advantages and benefits in more detail.

EXAMPLE I

2-Methylindene

The synthetic procedure reported for 2-methylindene in J. Org. Chem. 47, 1058 (1982) was followed to obtain the compound as a colorless oil after distillation.

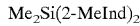

To a solution of 2-methylindene (2.58 g) in dry diethylether (150 ml), a solution of methyllithium in ether (1.4M, 14 ml) was added slowly at room temperature and stirred overnight. The solvents were removed under reduced pressure and the resulting solid was slurried in dry hexane (150 ml). Dichlorodimethylsilane diluted in ether (30 ml) was transferred into the previous solution which was prechilled to −78° C. The reaction mixture was allowed to come to room temperature and stirring continued overnight. The reaction mixture was filtered and the solvents were removed from the filtrate under reduced pressure to obtain a white solid. The solid was washed with a small amount of hexane which was prechilled to −78° C. to obtain a whiter powder (0.75 g). From the hexane wash a second crop of the ligand was obtained (0.25 g). Total yield was 32%.

The ligand (1.0 g) obtained from the previous procedure was dissolved in anhydrous tetrahydofuran (40 ml) and a solution of n-butyllithium in hexane (1.6M, 4.4 ml) was and stirred for 3 hours. The solvents were removed under vacuum to obtain a off-white solid which was washed with dry hexane under nitrogen atmosphere. The solid was cooled to −78° C. and methylene chloride prechilled to −78° C. was added followed by a slurry of zirconium tetrachloride in methylene chloride which was also prechilled to −78° C. The reaction mixture was allowed to gradually come to room temperature and stirred overnight. The solution was filtered and the solid was washed with hexane. The hexane washings were added to the filtrate at which time a off-white solid precipitated. Upon filtration the filtrate was concentrated and cooled to −78° C. for several hours to obtain a yellow solid. This yellow solid (0.30 g) was isolated by filtration and was found to be a mixture (65:35) of rac- and meso-isomers by NMR spectroscopy. $^1$HNMR (CD$_2$Cl$_2$) (in ppm), 7.67(2d), 7.45(d), 7.08(t), 6.99(t), 6.76(s), 6.74(s), 6.64(s), 2.44(s), 2.20(s), 1.42(s), 1.29(s), 1.22(s). The solid was used as such in polymerizations.

EXAMPLE 2

Et [Ind]$_2$ZrCl$_2$

This catalyst was prepared according to the published procedures, for example in references; Organometallics, 10, 1501 (1991), J. Organomet. Chem. 288, 63 (1985), J. Organomet. Chem. 342, 21 (1988).

EXAMPLE 3

Me$_2$Si[Ind]$_2$ZrCl$_2$

This catalyst was prepared according to the procedure described in European Patent Application No. 87870132.5 (Publication No. 0284708 published Oct. 5, 1988). For additional polymerization data, see "Transition Metals and Organometallics as Catalysts for Olefin Polymerization", p. 281, 1988; Eds. W. Kaminsky and H. Sinn., Published by Springer-Verlag Berlin, Heidelberg.

POLYMERIZATION PROCEDURES

TYPE I

The catalyst was dissolved in 5 ml of 10% MAO in toluene, transferred to a stainless steel sample transfer cylinder, and charged with 400 ml of propylene into an autoclave reactor containing 1000 ml of propylene stirring at room temperature. The catalyst was prepolymerized in situ by heating the reactor contents to 60° C. for one hour, the polymerization was terminated by rapidly venting the unreacted monomer and opening the reactor to the air. The contents of the reactor were dried in a vacuum oven. Atactic polymer produced by the meso-isomer was removed by recrystallizing the polymer samples from 1% xylene solutions prior to analysis.

TYPE II

The above was followed with only one minor change. The amount of MAO used in the polymerization was increased to 10 ml.

TABLE 1

| Catalyst, (mg) | Pol Type | Pol.T ° C. | Pol.t min. | Yield g | Iv dl/g[c] | Mw(GPC) x10$^{-3}$ | Tm (DSC) ° C. | MWD |
|---|---|---|---|---|---|---|---|---|
|  |||||||||
| 5 | I | 30 | 60 | 24 | 2.86 | 300 | 150 | |
| 1 | I | 60 | 30 | 37 | 1.86 | 200 | 148 | 2.6 |
| Me$_2$Si[Ind]$_2$ZrCl$_2$ |||||||||
| 3.5 | II | 30 | 60 | 9 | see[b] | 50 | 145 | 2.0 |
| 2 | II | 50 | 60 | 64 | see[b] | 37 | 142 | 2.3 |
| Et[3-MeInd]$_2$ZrCl$_2$[a] |||||||||
| 1.42 | I | 50 | 60 | 33 | see[a] | 31[a,c] | None | |
| Et[Ind]$_2$ZrCl$_2$ |||||||||
| 1.5 | I | 30 | 60 | 74 | 0.56 | — | 140 | 2.2 |
| 1.4 | II | 50 | 60 | 219 | 0.51 | 32 | 135 | 2.1 |

[a]Data taken from J. Ewen et al., in "Transition Metals and Organometallics as Catalyst for Olefin Polymerizations", p 281 (1988); Eds. W. Kaminsky and H. Sinn; Published by Springer-Verlag Berlin Heidelberg. Reported molecular weight from viscosity measurements, 31000.
[b]Not determined.
[c]Viscosity measurements were done on decaline solutions at 135° C.

Figure 2:
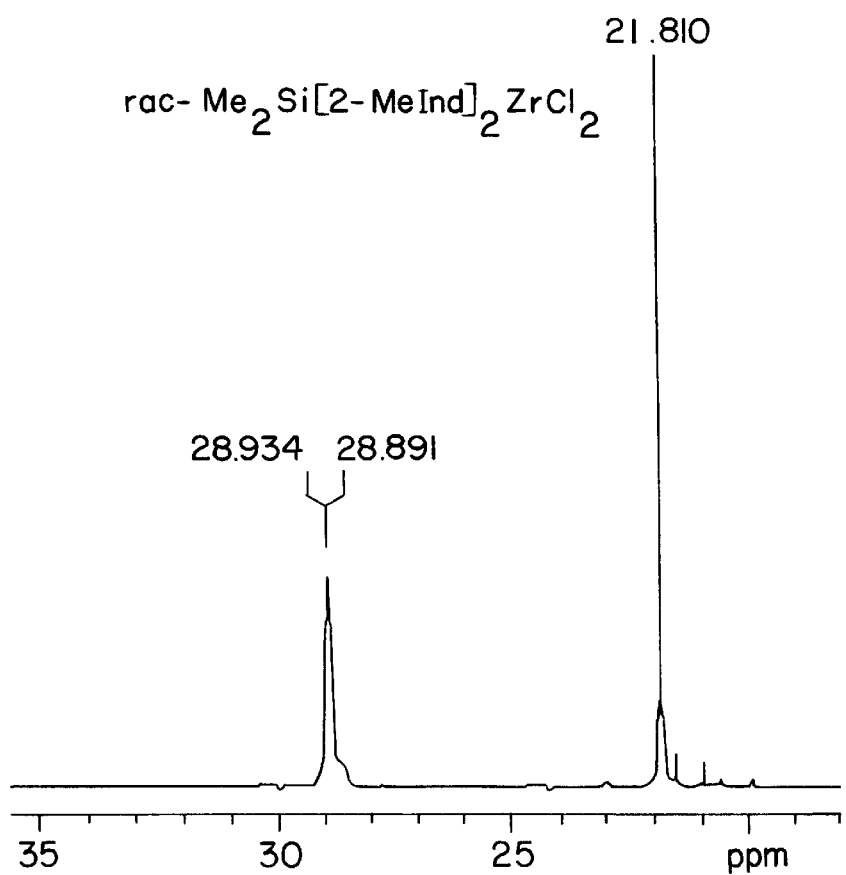
FIG. 2 is an NMR spectra for the polymer obtained with rac-dimethylsilylbis[2-methylindenyl]zirconium dichloride.

The polymerization data in Table 1 clearly points out that methyl substituent at C2 results in substantially different properties for polypropylene relative to the unsubstituted catalyst or the catalyst containing methyl substituent at C3. The silicon bridged catalyst containing a methyl substituent at C3 provides atactic polymer which does not show a melting point. The isotactic polypropylene obtained at a given polymerization temperature under similar conditions with the catalyst with a C2 methyl substituent has higher crystallinity (higher melting point) than that obtained with other similar catalyst systems listed in Table 1. The molecular weight of the polymer obtained with the catalyst with a C2 methyl substituent is also higher than that obtained with the other catalyst systems. Comparison of $^{13}$CNMR spectrum (see FIGS. 2 and 3) of the isotactic polypropylene obtained with the rac-Me$_2$Si[2-MeInd]$_2$ZrCl$_2$ with that published in the literature (Makromol. Chem. 190, 1931 (1989)) for ethylene bis(tetrahydroindenyl)ZrCl$_2$ shows that regio-irregularities in the polymer microstructures are drastically decreased in the polymer obtained with the former catalyst. It is also clear from the tabulated data that the 2-methylindenyl catalyst shows greater thermal stability than previously reported isospecific metallocenes with respect to stereospecificity and polymer chain termination (Tm−150° C., Mw=300000 at pol.T=30° C.; Tm=148° C., Mw=200000 at pol. T=60° C). It is expected that additional alkyl substituents on the aromatic ring at positions other than, those in close proximity to the catalytic center would also be beneficial in the production of isotactic polypropylene with high crystallinity and high molecular weight.

When polymerization results for rac-Me$_2$Si[2-MeInd]$_2$ZrCl$_2$ are compared to results for rac-Me$_2$Si[Ind]ZrCl$_2$, rac-Et[Ind]$_2$ZrCl$_2$, and rac-Et[3-MeInd]$_2$ZrCl$_2$, the effect of the proximal methyl substituent on molecular weight is shown to be remarkable. The molecular weight of polypropylene produced with the rac-Me$_2$Si[2-MeInd]$_2$ZrCl$_2$ catalyst system is at least 200,000. The proximal methyl substituent also results in a more stereospecific catalyst. Polymer melting points which reflect the degree of crystallinity increase with increasing metallocene structural rigidity. The melting point of polypropylene produced with the rac-Me$_2$Si[2-MeInd]$_2$ZrCl$_2$ catalyst system is at least 148° C.

The polymer produced with rac-Me$_2$Si[2-MeInd]$_2$ZrCl$_2$ has a microstructure due to enantiomorphic site control mechanism, as shown below:

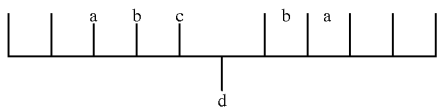

The methyl groups labeled "a", "b", "c", and "d" give the most intense signals in the C-13 NMR spectra. The intensity of the peak represent by "d" is a direct measure of the number of mistakes (mrrm) in monomer π-face selectivity (re vs. si), providing the probability of "errors" in close succession is negligible. The C-13 NMR pentad intensities for polymer produced with rac-Me$_2$Si[2-MeInd]$_2$ZrCl$_2$ at 60° C. is given below:

|  | % |
|---|---|
| mmmm | 92 |
| mmmr | 4 |
| mmrr | 3 |
| mrrm | 1 |

The C-13 NMR spectra of polymer produced with rac-Me$_2$Si[2-MeInd]$_2$ZrCl$_2$ show no regio-regularities and the differences between observed polymer melting points and the melting point of perfectly stereoregular isotactic polypropylene are primarily due to the number of stereospecific "site errors".

The metallocene catalysts of this invention produce isotactic polymer with melting points similar to commercial grades of homopolymer produced with conventional Ziegler-Natta catalysts. The metallocenes, when pure, are single site catalysts which produce isotactic propylene with a polydispersity of approximately 2.0–2.5.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States of America is:

1. A process for the polymerization of olefins of at least three carbon atoms comprising:
   (a) selecting a predominantly racemic stereorigid metallocene described by the formula:

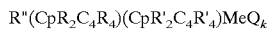

wherein (CpR$_2$C$_4$R$_4$) and (CpR'$_2$C$_4$R'$_4$) are substituted indenyl rings; each R and R' is a hydrogen or hydrocarbyl radical having 1–20 carbon atoms, each R being the same or different, each R' also being the same or different, one R and R' being a hydrocarbyl radical having 1–20 carbon atoms in a proximal position adjacent to the bridgehead carbon of the indenyl rings; R" is a structural bridge between the two indenyl rings imparting stereorigidity to the indenyl rings; Me is a Group IVB, Group VB, or Group VIB transition metal; and each Q is a hydrocarbyl radical or is a halogen and k is the valence of Me minus 2; and
   (b) forming a catalyst by contacting the metallocene with a cocatalyst or a Lewis acid ionic ionizing agent;
   (c) bringing the catalyst in contact with an alpha olefin of at least three carbon atoms under polymerization conditions; and
   (d) extracting isotactic polyolefin.

2. A process as recited in claim 1 wherein the metallocene is:

3. A process as recited in claim 1 wherein R and R' are the same.
4. A process as recited in claim 1 wherein R and R' is an alkyl radical of 1–4 carbon atoms.
5. A process as recited in claim 1 wherein R and R' is a methyl radical.
6. A process as recited in claim 1 wherein R" comprises a hydrocarbyl radical and comprises silicon as the bridging component.
7. A process as recited in claim 5 wherein R" comprises an alkyl radical of one to eight carbon atoms and comprises silicon as the bridging component.
8. A process as recited in claim 7 wherein R" is dimethylsilyl.
9. A process as recited in claim 1 wherein Me is a Group IVB metal.
10. A process as recited in claim 9 wherein Me is zirconium.
11. A process as recited in claim 10 wherein Q is a halogen.
12. A process as recited in claim 11 wherein Q is chlorine.
13. A process as recited in claim 1 wherein (CpR$_2$C$_4$R$_4$) and (CpR'$_2$C$_4$R'$_4$) are 2-methyl indenyl.
14. A process as recited in claim 1 wherein the metallocene comprises rac-dimethylsilylbis[2-methylindenyl]zirconium dichloride.
15. A process as recited in claim 1 wherein the cocatalyst is alumoxane.
16. A process as recited in claim 1 wherein the olefin is propylene.
17. A process as recited in claim 16 wherein the molecular weight of the isotactic polypropylene is at least 200,000.
18. A process as recited in claim 16 wherein the melting point of the isotactic polypropylene is at least 148° C.
19. A process for the polymerization of propylene comprising:
   (a) selecting a predominantly racemic stereorigid metallocene described by the formula:

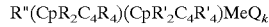

wherein (CpR$_2$C$_4$R$_4$) and (CpR'$_2$C$_4$R'$_4$) are substituted indenyl rings; each R and R' is a hydrogen or hydrocarbyl radical having 1–20 carbon atoms, each R being the same or different, each R' also being the same or different, one R and one R' being a hydrocarbyl radical having 1–20 carbon atoms in a proximal position adjacent to the bridgehead carbon of the indenyl rings; R" is a structural bridge between the two indenyl rings imparting stereorigidity to the indenyl rings; Me is a Group IVB, Group VB, or Group VIB transition metal; and each Q is a hydrocarbyl radical or is a halogen; and k is the valence of Me minus 2; and
   (b) forming a catalyst by contacting the metallocene with a cocatalyst or a Lewis acid ionic ionizing agent;
   (c) bringing the catalyst in contact with propylene under polymerization conditions; and
   (d) extracting isotactic propylene polymer.

20. The process of claim 19 wherein the metallocene is dimethlsilylbis[2-methylindenyl]zirconium dichloride.
21. The process of claim 20 wherein the cocatalyst is methylalumoxane.

* * * * *